United States Patent
Kim

(10) Patent No.: US 12,291,653 B2
(45) Date of Patent: May 6, 2025

(54) WATER-BASED FIRE-RESISTANCE PAINT COMPOSITION

(71) Applicant: Green Solution LLC, Pearce, AZ (US)

(72) Inventor: Kwang Hwan Kim, Goyang-si (KR)

(73) Assignee: Green Solution LLC, Pearce, AZ (US)

( * ) Notice: Subject to any disclaimer, the term of this patent is extended or adjusted under 35 U.S.C. 154(b) by 4 days.

(21) Appl. No.: 18/210,687

(22) Filed: Jun. 16, 2023

(65) Prior Publication Data

US 2024/0117199 A1    Apr. 11, 2024

(30) Foreign Application Priority Data

Jun. 16, 2022    (KR) .................. 10-2022-0073386

(51) Int. Cl.
| | |
|---|---|
| C09D 5/18 | (2006.01) |
| C09D 7/20 | (2018.01) |
| C09D 7/45 | (2018.01) |
| C09D 7/61 | (2018.01) |
| C09D 7/63 | (2018.01) |
| C09D 7/65 | (2018.01) |

(52) U.S. Cl.
CPC .............. C09D 5/18 (2013.01); C09D 7/20 (2018.01); C09D 7/45 (2018.01); C09D 7/61 (2018.01); C09D 7/63 (2018.01); C09D 7/65 (2018.01)

(58) Field of Classification Search
None
See application file for complete search history.

(56) References Cited

U.S. PATENT DOCUMENTS

| | | | |
|---|---|---|---|
| 6,753,363 B1 * | 6/2004 | Harashina | C08L 59/00 |
| | | | 524/99 |
| 11,859,097 B2 * | 1/2024 | Kim | C08K 3/26 |
| 2019/0233642 A1 * | 8/2019 | Osborn | C08K 5/34928 |
| 2021/0040336 A1 * | 2/2021 | Kim | C09D 7/70 |
| 2021/0054198 A1 * | 2/2021 | Osborn | C08L 77/10 |

FOREIGN PATENT DOCUMENTS

| | | |
|---|---|---|
| KR | 10-2000-0046451 A | 7/2000 |
| KR | 10-0377832 B1 | 3/2003 |
| KR | 10-2017-0096528 A | 8/2017 |
| KR | 10-2019-0066360 A | 6/2019 |

* cited by examiner

*Primary Examiner* — Joseph D Anthony
(74) *Attorney, Agent, or Firm* — Revolution IP, PLLC

(57) ABSTRACT

The present invention provides an inorganic eco-friendly water-based type fire-resistant paint composition comprising 5 to 15% by weight of pentaerythritol, 1 to 5% by weight of ethylenediaminetetraacetic acid (EDTA) as a water softener, 5 to 20% by weight of hydroxyethyl cellulose, 5 to 20% by weight of poly(vinyl acetate) emulsion, 10 to 25% by weight of ammonium polyphosphate, 5 to 20% by weight of melamine cyanurate, 1 to 10% by weight of glass fiber chop, 1 to 10% by weight of pigment, 3 to 25% by weight of propylene glycol, 5 to 20% by weight of Texanol ((3-hydroxy-2,2,4-trimethylpentyl) 2-methylpropanoate), and 1 to 5% by weight of additives.

4 Claims, No Drawings

WATER-BASED FIRE-RESISTANCE PAINT COMPOSITION

TECHNICAL FIELD

The present invention relates to a water-based fire-resistant paint composition, and relates to an inorganic eco-friendly water-based type fire-resistant paint composition with improved durability while minimizing the use of harmful substances.

BACKGROUND ART

Steel frames have limitations in bending, twisting, or melting due to heat in the event of a fire. Accordingly, in order to prevent building collapse and damage to human life and property, the coating of nationally recognized fire-resistant materials on the steel frame surface is a steel frame fire-resistant coating. Fire-resistant coating materials are divided into spray coating materials and paints. The spray coating material is divided into a semi-wet type, which is banned due to the problem of harmful dust such as glass powder, and a wet type that is currently used the most.

The wet spray coating material has inorganic raw materials as its main component, and is in the form of being mixed with water and sprayed on the coated surface, which makes it difficult to secure a constant quality due to the different effects on the construction surface depending on the product and spraying method, and which has fundamental limitations such as adhesion and dust after construction.

The fire-resistant paint is a paint coated on steel structures such as buildings, plants, and special ships, which is a functional paint that protects a steel structure by expanding the coating film in the event of a fire and then forming a fire-resistant insulation layer to prevent degradation of the strength of the steel structure. Although the steel material of the steel frame structure is non-combustible, when the internal temperature reaches 550~600° C. or higher due to fire, the tensile strength is greatly reduced, and thus the original structural function is not displayed. Therefore, in order to prevent deformation and collapse of major structures in the event of a fire, the main part of the structure is prescribed by law to be protected from flame and high heat by using fire-resistant paint.

The fire-resistant paint has the advantage of being able to obtain the same finishing effect as paint by directly painting the steel frame structure, and has the advantage of solving the problem of dust or adhesion of the spray coating material. The fire-resistant covering materials are divided into inorganic and organic as the products that require the highest technology. However, the organic paint is widely used as an organic compound with an organic foamed carbonization layer mechanism, but its use is currently limited mainly in developed countries due to problems such as the generation of harmful gases to the human body, the limitation of resin (polymer), the persistence of fire resistance due to the nature of organic solvents, and the uniformity of quality, and thus the use and development of eco-friendly inorganic paint as an alternative material is actively progressing.

The inorganic paint is characterized by excellent fire resistance performance, eco-friendliness, and construction safety by using ceramic inorganic materials as raw materials, but is pointed out as a problem such as limitations in water resistance and durability supplementation due to strong alkalinity. However, the inorganic paint is evolving with the development of flame retardants.

PRIOR ART DOCUMENT

[Patent document]
Korean Patent Registration No. 10-0377832

DESCRIPTION

Problems to be Solved

It is an object of the present invention to provide an inorganic eco-friendly water-based type fire-resistant paint composition as a covering material for preventing bending and twisting of steel frames due to heat in the event of a fire, which has excellent fire resistance performance to block or delay the access of high-temperature heat, is a water-based type that minimizes the generation of volatile organic substances and harmful gases and provides excellent durability by exhibiting excellent adhesion to steel frames.

Technical Solution

In order to achieve the above object, the present invention provides an inorganic eco-friendly water-based type fire-resistant paint composition comprising 5 to 15% by weight of pentaerythritol, 1 to 5% by weight of ethylenediaminetetraacetic acid (EDTA) as a water softener, 5 to 20% by weight of hydroxyethyl cellulose, 5 to 20% by weight of poly(vinyl acetate) emulsion, 10 to 25% by weight of ammonium polyphosphate, 5 to 20% by weight of melamine cyanurate, 1 to 10% by weight of glass fiber chop, 1 to 10% by weight of pigment, 3 to 25% by weight of propylene glycol, 5 to 20% by weight of Texanol ((3-hydroxy-2,2,4-trimethylpentyl) 2-methylpropanoate), and 1 to 5% by weight of additives.

Advantageous Effect

The inorganic eco-friendly water-based type fire-resistant paint composition according to the present invention has excellent fire resistance performance to block or delay the access of high-temperature heat, is a water-based type that minimizes the generation of volatile organic substances and harmful gases and provides excellent durability by exhibiting strong adhesion to steel frames.

DETAILED DESCRIPTION

Hereinafter, the present invention will be described in detail.

The inorganic eco-friendly water-based type fire-resistant paint composition of the present invention is characterized in that it contains 5 to 15% by weight of pentaerythritol, 1 to 5% by weight of ethylenediaminetetraacetic acid (EDTA) as a water softener, 5 to 20% by weight of hydroxyethyl cellulose, 5 to 20% by weight of poly(vinyl acetate) emulsion, 10 to 25% by weight of ammonium polyphosphate, 5 to 20% by weight of melamine cyanurate, 1 to 10% by weight of glass fiber chop, 1 to 10% by weight of pigment, 3 to 25% by weight of propylene glycol, 5 to 20% by weight of Texanol ((3-hydroxy-2,2,4-trimethylpentyl) 2-methylpropanoate), and 1 to 5% by weight of additives.

The pentaerythritol is a white or slightly yellow crystal which performs a function of minimizing heat transfer while expanding during a fire. The pentaerythritol is contained in an amount of 5 to 15% by weight based on the total weight of the inorganic eco-friendly water-based type fire-resistant paint composition. If the content of pentaerythritol is out of the above range, it may rather cause problems in processability, such as a decrease in fire resistance performance or an increase in viscosity.

The ethylenediaminetetraacetic acid (EDTA) as a water softener is not only used in analytical chemistry such as analysis, separation, and removal of metal ions, and measurement of trace metal ions, but also is used for various purposes such as softening of hard water, separation of rare earth elements, removal of kidney stones, prevention of oxidation of vitamin C, prevention of deterioration of food due to metal, a detergent, and an anti-precipitation agent for heavy metal ions.

The hydroxyethyl cellulose is used as a binder, an emulsion stabilizer, a film forming agent, and a viscosity increasing agent (aqueous). As the hydroxyethyl cellulose, components known in the art may be used without limitation, and for example, HEC-HHR may be used.

The poly(vinyl acetate) emulsion is used for high-quality, low-VOC paint, and is used as a binder and a film forming agent. It is a kind of water-soluble adhesive which is a thermoplastic adhesive made by polymerization of vinyl acetate monomer under the action of an initiator, commonly called white latex or PVAC emulsion.

The poly(vinyl acetate) emulsion increases the strength of the fire-resistant paint and at the same time plays a role of preventing cracks from occurring in the coating film, preventing their falling off, and increasing vibration resistance, when an external impact is applied to the fire-resistant paint.

The poly(vinyl acetate) emulsion is contained in an amount of 5 to 20% by weight based on the total weight of the inorganic eco-friendly water-based type fire-resistant paint composition. If the poly(vinyl acetate) emulsion is contained in an amount of less than 5% by weight, physical properties required for fire-resistant paint cannot be obtained. If the poly(vinyl acetate) emulsion is contained in an amount exceeding 20% by weight, a problem in which heat resistance and fire resistance performance is rather deteriorated occurs.

As the poly(vinyl acetate) emulsion, any component known in the art may be used without limitation.

The ammonium polyphosphate is a high molecular weight inorganic salt derived from phosphoric acid. When the ammonium polyphosphate is exposed to fire or heat (decomposition at 240° C.), polyphosphoric acid and ammonia decompose, do not release toxic vapors into the air, and plays a role in slowing the spread of fire. Polyphosphoric acid reacts with alcohol groups to form unstable phosphate esters which in turn decompose to release carbon dioxide. It is a typical phosphorus-nitrogen flame retardant.

During the combustion process, it acts as a flame retardant due to surface coating, heat dissipation by evaporation of phosphorus compounds, dilution of decomposition products, and reduction of melt viscosity. It is used as an excellent flame retardant due to its high phosphorus content of 30%.

If the ammonium polyphosphate is contained in an amount of less than 10% by weight, it is difficult to exhibit flame retardant performance properly. If the ammonium polyphosphate exceeds 25% by weight, it is not preferable because there is a problem of reducing adhesion.

The melamine cyanurate has excellent thermal stability and low solubility in water. The melamine cyanurate is also non-toxic during use or in case of fire, is easy to handle and process, and is thermally and chemically stable. The melamine cyanurate produces less smoke than other flame retardants.

The glass fiber chop plays a role of preventing cracks in the coating film when pentaerythritol expands by reaction. The glass fiber chop may preferably have a length of 3 mm to 5 mm.

If the glass fiber chop is contained in an amount of less than 1% by weight, it is difficult to prevent the phenomenon of cracking and dripping of the coating film. If the glass fiber chop exceeds 10% by weight, there is a possibility that the viscosity of the paint becomes too high and handling becomes difficult.

The pigment is a colorant that develops color in a material. The pigment is a finely powdered solid that is insoluble in water or oil. The pigment is classified into inorganic pigment and organic pigment. The inorganic pigment is stable against heat or sunlight, and has the characteristic of not changing color. The organic pigment is a water-insoluble form of dye, has vivid colors and is of many kinds. As the pigment, any pigment known in the art may be used without limitation, but $TiO_2$ may be preferably used.

The propylene glycol has a molecular weight of 76.09, is colorless, transparent, odorless, and is a hygroscopic liquid that has less solubility and toxicity than other solvents. The propylene glycol has excellent color, odor, and volatility, and its toxicity is very weak, which is about the same as that of glycerin.

The Texanol ((3-hydroxy-2,2,4-trimethylpentyl)-2-methylpropanoate) is one of the best film forming agents used in the paint, and it can be used under a variety of climatic conditions and on a variety of surfaces, and is applicable to all types of latex paints. This solvent improves paint properties such as adsorption at low temperature, scrub resistance, washability, color, and heat flexibility, and enhances the thickening efficiency when used in combination with an appropriate thickening agent. This solvent has been certified as Green Label II in China because of its low toxicity, biodegradability and VOC-free.

As the additives, at least one selected from the group consisting of a dispersing agent, an antifoaming agent, and an anti-settling agent may be further comprised, in order to disperse solids, remove bubbles, and prevent sedimentation.

The dispersing agent may perform a function of improving the dispersibility of the pigment. As the dispersing agent, a dispersing agent known in the art may be used without limitation. For example, a commercially available dispersing agent such as DisperbyK 190 may be purchased and used.

The antifoaming agent is used to defoam air bubbles present in the paint. As the antifoaming agent, components known in the art may be used without limitation. For example, a commercially available antifoaming agent such as BYK 019 may be purchased and used.

In one embodiment of the present invention, the inorganic eco-friendly water-based type fire-resistant paint composition may further comprise 1 to 3% by weight of silicon nitride ($Si_3N_4$) and 1 to 3% by weight of aluminum oxynitride (AlON).

The ingredients mentioned above provide the effect of enhancing fire resistance. That is, the silicon nitride ($Si_3N_4$) is a ceramic having a melting point of 1,900° C., and the melting point of aluminum oxynitride (AlON) is 2150° C., and accordingly, it performs the function of maintaining the shape of the coating film in the event of a fire.

In one embodiment of the present invention, the inorganic eco-friendly water-based type fire-resistant paint composition may further include 1 to 3% by weight of lithium hydroxide. The above-mentioned components perform a role of adsorbing and fixing Cl⁻ ions that cause the prevention of salt damage.

In one embodiment of the present invention, the fire-resistant paint may further include 3 to 10% by weight of a copolymer represented by Formula 1 below.

[Formula 1]

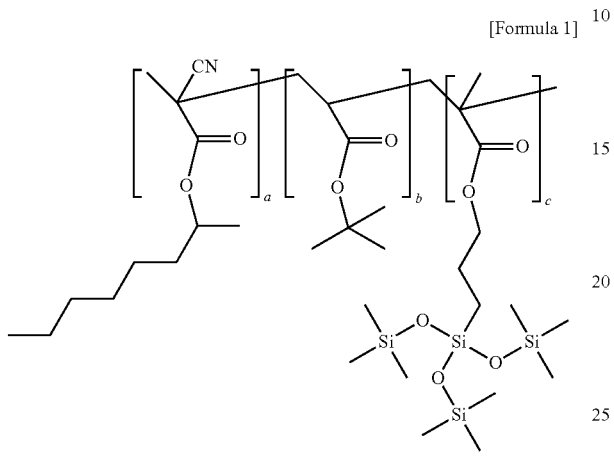

wherein a, b and c represent mole fractions, and
a is 0.1 to 0.4, b is 0.1 to 0.4, c is 0.3 to 0.7, and a+b+c is 1.

The 2-octylcyanoacrylate monomer-derived unit comprised in the copolymer of Formula 1 is a monomer that provides excellent adhesion to organic and inorganic materials. In addition, methacryloxypropyltris(trimethylsiloxy)silane (CAS No: 17096-07-0) monomer derived-units form very good bonds with organic and inorganic materials. In addition, the t-butyl acrylate monomer derived-unit also forms good bonds with organic and inorganic materials.

The copolymer of Formula 1 allows the pigment to be well dispersed in the fire-resistant paint, improves the strength of the paint film and strengthens the adhesion of the paint to the steel frame structure.

The copolymer of Formula 1 is a random copolymer, and may have a weight average molecular weight of 50,000 to 500,000, more preferably 150,000 to 300,000.

Hereinafter, the present invention will be described in detail through preferred examples. However, this only has the purpose of clarifying the practice of the invention to those skilled in the art, and does not mean that the scope of the present invention is limited by these examples.

Example 1: Preparation of Inorganic Eco-Friendly Water-Based Type Fire-Resistant Paint Composition 8% by weight of pentaerythritol, 3% by weight of ethylenediaminetetraacetic acid (EDTA) as a water softener, 10% by weight of hydroxyethyl cellulose, 10% by weight of poly(vinyl acetate) emulsion, 15% by weight of ammonium polyphosphate, 15% by weight of melamine cyanurate (MCA-15), 5% by weight of glass fiber chop (3-5 mm), 8% by weight of pigment, 16.5% by weight of propylene glycol, 8% by weight of Texanol ((3-hydroxy-2,2,4-trimethylpentyl) 2-methylpropanoate), 0.5% by weight of an antifoaming agent BYK 019, and 1% by weight of a dispersing agent DisperbyK 190 were mixed to prepare an inorganic eco-friendly water-based type fire-resistant paint composition.

Example 2: Preparation of Inorganic Eco-Friendly Water-Based Type Fire-Resistant Paint Composition 8% by weight of pentaerythritol, 3% by weight of ethylenediaminetetraacetic acid (EDTA) as a water softener, 10% by weight of hydroxyethyl cellulose, 10% by weight of poly(vinyl acetate) emulsion, 13% by weight of ammonium polyphosphate, 13% by weight of melamine cyanurate (MCA-15), 5% by weight of glass fiber chop (3-5 mm), 8% by weight of pigment, 16.5% by weight of propylene glycol, 8% by weight of Texanol ((3-hydroxy-2,2,4-trimethylpentyl) 2-methylpropanoate), 0.5% by weight of an antifoaming agent BYK 019, 1% by weight of a dispersing agent DisperbyK 190, 2% by weight of silicon nitride ($Si_3N_4$), and 2% by weight of aluminum oxynitride (AlON) were mixed to prepare an inorganic eco-friendly water-based type fire-resistant paint composition.

Example 3: Preparation of Inorganic Eco-Friendly Water-Based Type Fire-Resistant Paint Composition 8% by weight of pentaerythritol, 3% by weight of ethylenediaminetetraacetic acid (EDTA) as a water softener, 8% by weight of hydroxyethyl cellulose, 8% by weight of poly(vinyl acetate) emulsion, 13% by weight of ammonium polyphosphate, 13% by weight of melamine cyanurate (MCA-15), 5% by weight of glass fiber chop (3-5 mm), 8% by weight of pigment, 16.5% by weight of propylene glycol, 7% by weight of Texanol ((3-hydroxy-2,2,4-trimethylpentyl) 2-methylpropanoate), 0.5% by weight of an antifoaming agent BYK 019, 1% by weight of a dispersing agent DisperbyK 190, 2% by weight of silicon nitride ($Si_3N_4$), 2% by weight of aluminum oxynitride (AlON), and 5% by weight of a copolymer represented by Formula 1 below were mixed to prepare an inorganic eco-friendly water-based type fire-resistant paint composition.

Preparation Example 1: Preparation of Copolymer of Formula 1

2-octylcyanoacrylate, methacryloxypropyltris(trimethylsiloxy)silane (CAS No: 17096-07-0) and t-butyl acrylate in a molar ratio of 0.2:0.5:0.3 were added to ethylbenzene as a reaction solvent, and 0.5 parts by weight of normal mercaptan was mixed with 100 parts by weight of all monomers and made uniform. While introducing the polymerization solution prepared above into a 20 L reactor at a rate of 10 L/hr, polymerization was performed at 100° C., unreacted monomers and reaction solvents were removed in a volatilization tank at 150° C., and washing, dehydration, and drying were performed to obtain a copolymer of Formula 1 having a weight average molecular weight of 245,000.

[Formula 1]

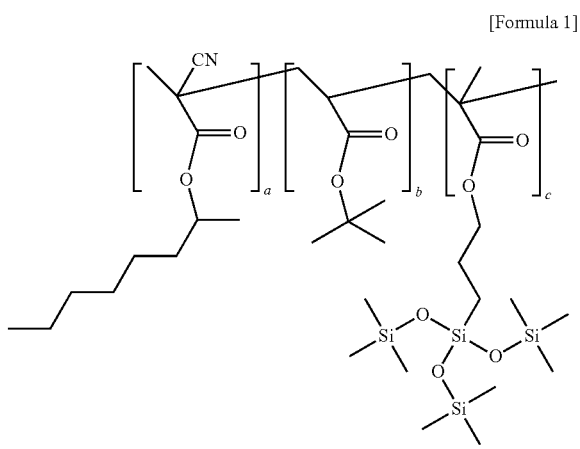

wherein a, b and c represent mole fractions, and a is 0.2, b is 0.3, c is 0.5.

Experimental Example 1: Evaluation of fire resistance performance

The fire resistance test of the inorganic eco-friendly water-based type fire-resistant paint composition prepared in Examples 1 to 3 was conducted according to KSF 2257 (Fire resistance test method for building structural members).

Specimens were steel frames 300×300×10×15 mm, length 3000 mm, thermocouple KSC 1602 type K (wire diameter 0.65 mm or less) was installed in a hole with a diameter of 3 mm.

The inorganic eco-friendly water-based type fire-resistant paint composition prepared in Examples 1 to 3 was coated on the surface of the steel frame of the specimen to a thickness of 3 mm, and then placed in the furnace and heated.

The heating temperature conditions in the furnace were heated with a heating time (Rating) of 2 hours according to, T=345 log10(8t+1)+20 (T=average temperature in the furnace ° C., t=time min), and the results are shown in Table 1 below.

TABLE 1

| | Example 1 fire-resistant paint | Example 2 fire-resistant paint | Example 3 fire-resistant paint |
| --- | --- | --- | --- |
| Fire resistance temperature (average temperature of thermocouple 3 points ° C.) | 510 | 450 | 431 |

In KSF 2257(Co., Ltd.), the standard average temperature is set at 538° C. (maximum temperature 649° C.). From the results of Table 1, it can be seen that the fire-resistant paint of the present invention has excellent heat shielding performance.

Experimental Example 2: Evaluation of Adhesion Strength

Adhesion strength is to measure the adhesion and cohesion between the steel plate substrate and the fire-resistant paint.

The measurement of adhesion strength was carried out according to KSM ISO 4624 (attachment and peeling test method of paint and varnish). The inorganic eco-friendly water-based type fire-resistant paint composition prepared in Examples 1 to 3 was coated on a steel plate of a certain size (70×70 mm) to a thickness of 4 mm and dried under prescribed conditions, and then aged for at least 24 hours at a temperature of 23±2° C. and a relative humidity of 50±5%. Epoxy adhesive was applied to a steel bar with a diameter of 20 mm and then pressed to the paint-coated surface (excess epoxy adhesive by pressing was immediately removed). After the adhesive was cured, an adhesion test was conducted at a speed of 1 MPa/S in the test for adhesion strength.

S=4F/πd² [S: Adhesion strength (mPa), F: Measured value of breaking force (N), d: Diameter of test cylinder (mm)]

TABLE 2

| | Example 1 fire-resistant paint | Example 2 fire-resistant paint | Example 3 fire-resistant paint |
| --- | --- | --- | --- |
| Adhesion strength(mPa) | 1.20 | 1.24 | 1.30 |

From the results of Table 1, it can be seen that the adhesion strength performance of the fire-resistant paint of the present invention is very good.

The invention claimed is:

1. A eco-friendly water-based type fire-resistant paint composition comprising 5 to 15% by weight of pentaerythritol, 1 to 5% by weight of ethylenediaminetetraacetic acid (EDTA) as a water softener, 5 to 20% by weight of hydroxyethyl cellulose, 5 to 20% by weight of poly(vinyl acetate) emulsion, 10 to 25% by weight of ammonium polyphosphate, 5 to 20% by weight of melamine cyanurate, 1 to 10% by weight of glass fiber chop, 1 to 10% by weight of pigment, 3 to 25% by weight of propylene glycol, 5 to 20% by weight of Texanol ((3-hydroxy-2,2,4-trimethylpentyl) 2-methylpropanoate), and 1 to 5% by weight of additives.

2. The eco-friendly water-based type fire-resistant paint composition according to claim 1, wherein the additive is at least one selected from the group consisting of a dispersing agent and an antifoaming agent.

3. The eco-friendly water-based type fire-resistant paint composition according to claim 1, wherein the fire-resistant paint composition further comprises 1 to 3% by weight of silicon nitride ($Si_3N_4$) and 1 to 3% by weight of aluminum oxynitride (AlON).

4. The eco-friendly water-based type fire-resistant paint composition according to claim 3, wherein the fire-resistant paint composition further comprises 3 to 10% by weight of a copolymer represented by Formula 1 below:

[Formula 1]
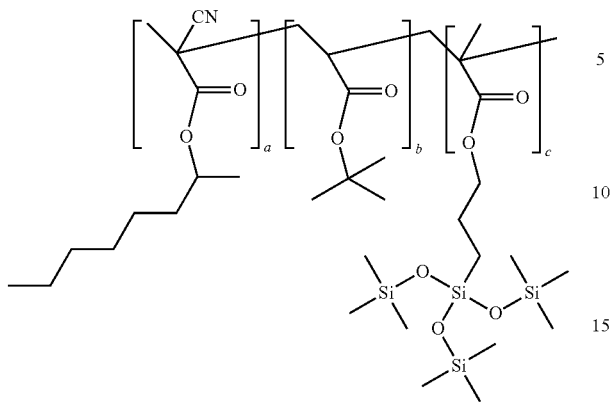
wherein a, b and c represent mole fractions, and a is 0.1 to 0.4, b is 0.1 to 0.4, c is 0.3 to 0.7, and a+b+c is 1.
* * * * *